Figure 1:
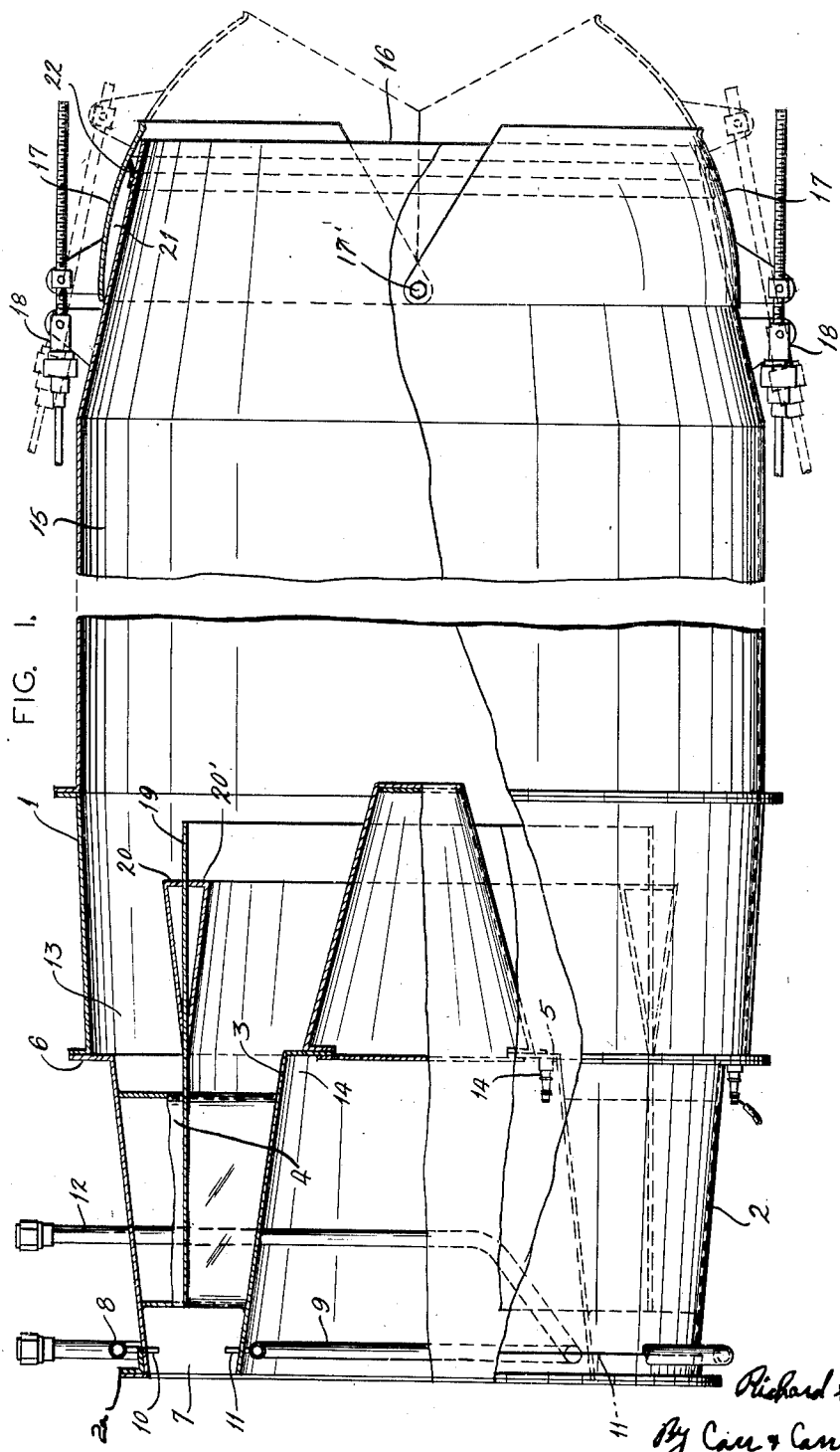

May 12, 1953  R. G. LAUCHER  2,637,972
AFTERBURNER FOR TURBOJET ENGINES AND THE LIKE
Filed April 9, 1948  5 Sheets-Sheet 2

INVENTOR:
Richard G. Laucher,
By Carr & Carr & Gravely,
HIS ATTORNEYS.

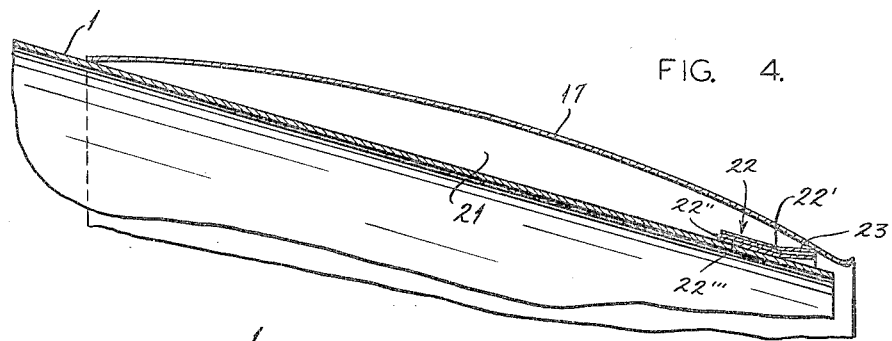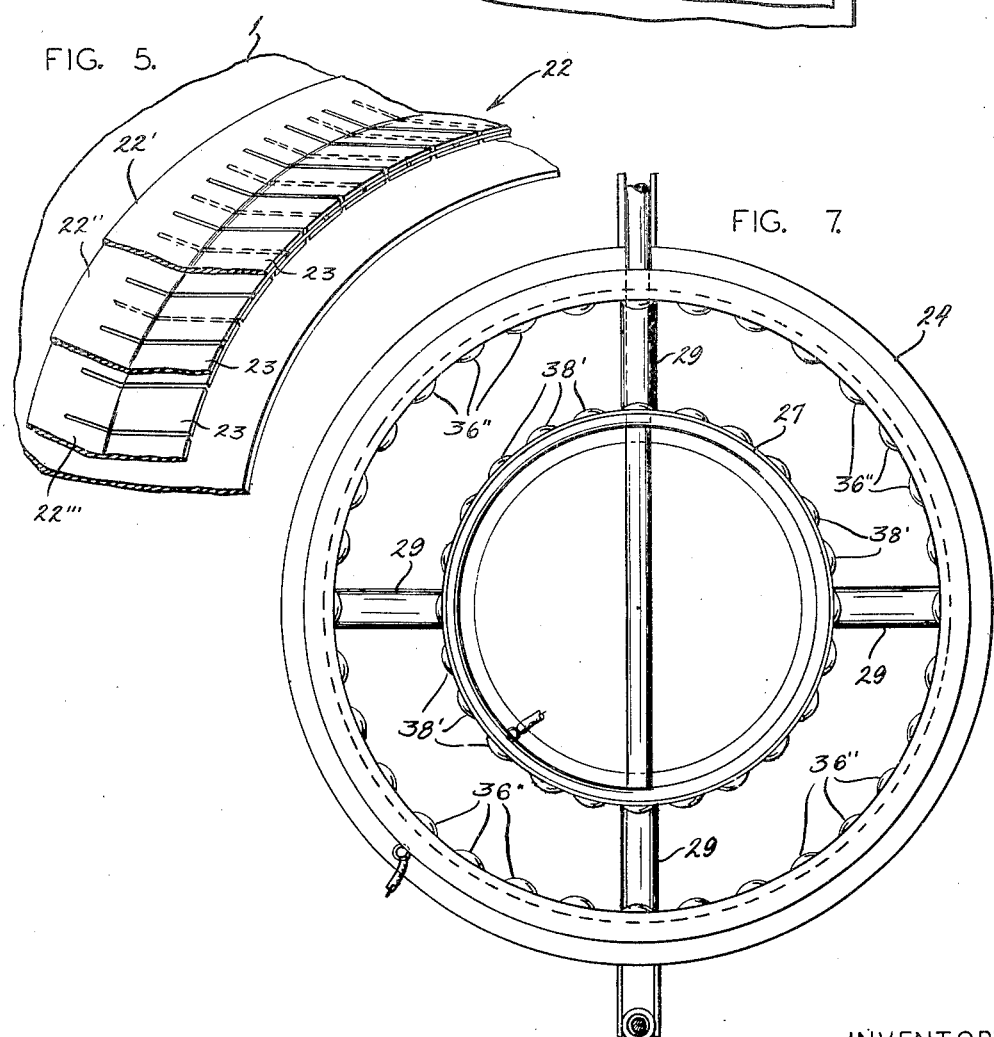

May 12, 1953
R. G. LAUCHER
2,637,972
AFTERBURNER FOR TURBOJET ENGINES AND THE LIKE
Filed April 9, 1948
5 Sheets-Sheet 4
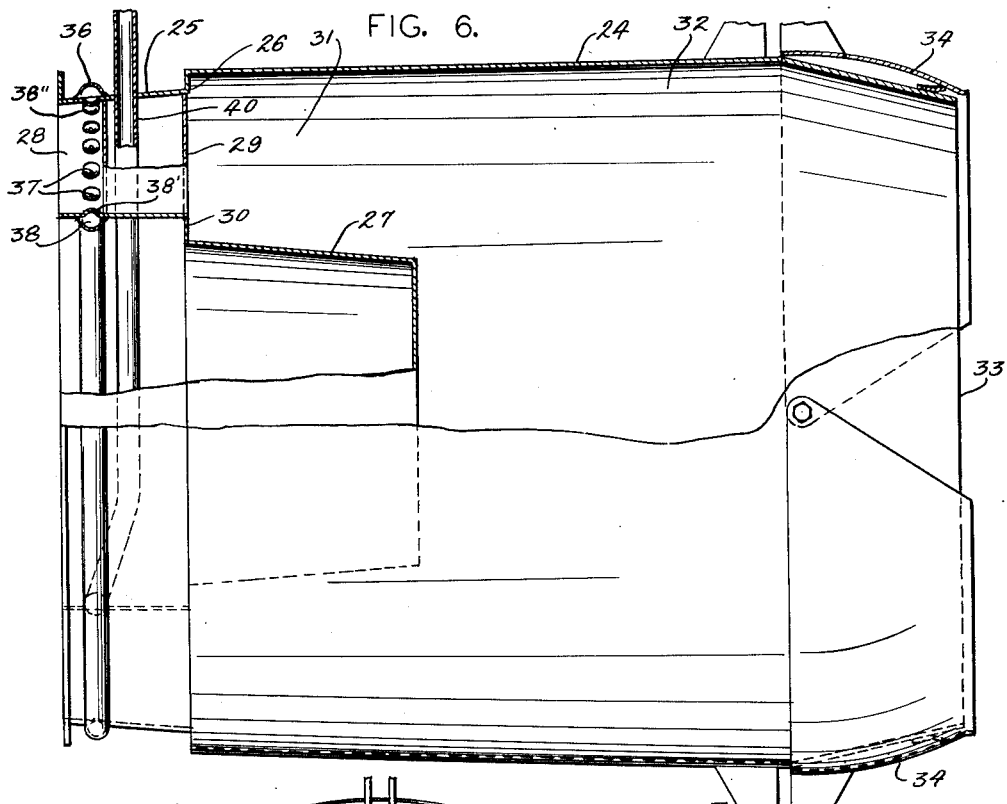
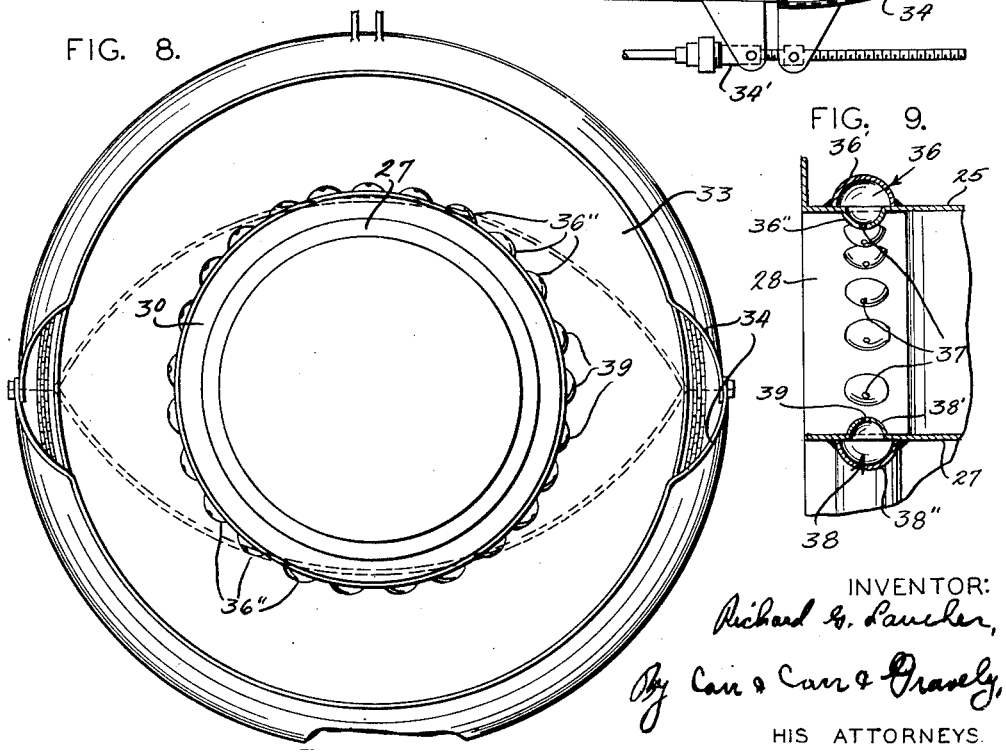
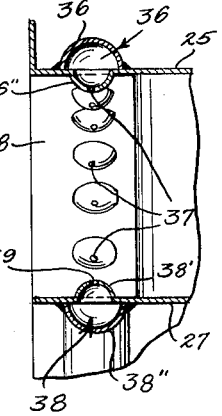
INVENTOR:
Richard G. Laucher,
By Carr & Carr & Gravely,
HIS ATTORNEYS.

May 12, 1953  R. G. LAUCHER  2,637,972
AFTERBURNER FOR TURBOJET ENGINES AND THE LIKE
Filed April 9, 1948  5 Sheets-Sheet 5

INVENTOR:
Richard G. Laucher,
By Carr & Carr & Grandy
HIS ATTORNEYS.

Patented May 12, 1953

2,637,972

UNITED STATES PATENT OFFICE 2,637,972

AFTERBURNER FOR TURBOJET ENGINES AND THE LIKE

Richard G. Laucher, Kirkwood, Mo., assignor to McDonnell Aircraft Corporation, St. Louis, Mo., a corporation of Maryland Application April 9, 1948, Serial No. 19,957

13 Claims. (Cl. 60—35.6)

This invention relates to thrust producing devices and is more particularly directed to mechanism for augmenting the thrust of a turbojet engine.

The object of the invention is to produce an afterburner and thrust augmenter capable of operating in connection with a turbojet engine that utilizes the unused oxygen in the exhaust gases of the turbojet engine to increase the temperature and velocity of the exhaust gases derived from the turbojet engine.

Another object of the invention is to produce an afterburner for a turbojet engine and whose operation is similar to that of a ram jet engine in order to increase the thrust of the turbojet engine.

A further object of the invention is to produce a ram jet engine or afterburner having a 180° diffusion step in order to better hold the flame to thereby secure an improved combustion and reduce internal losses to thereby improve the operating characteristics and output of the engine. The step controls the eddying effect of a large angle diffuser, serves as a flame anchoring turbulent area, and combines two parts of the afterburner to result in lower pressure loss and shorter length.

Another object of the invention is to produce an afterburner for jet propulsion engines provided with a variable exhaust nozzle so that the thrust output of the primary jet engine can be controlled, and when the variable nozzle is in its maximum open position, the device is employable as an afterburner to increase the thrust of the primary jet engine.

Still another object of the invention is to provide an exhaust nozzle area control for a rotary or turbojet engine and which is capable of operating as a ram or other type of jet engine when operating alone, at which time the exit area control is adjusted to maximum area.

Another object of the invention is to provide an improved seal for the eyelid exit area controls for a jet engine.

A still further object of the invention is to provide an improved fuel distribution and injection system for jet propulsion engines.

Figure 2:
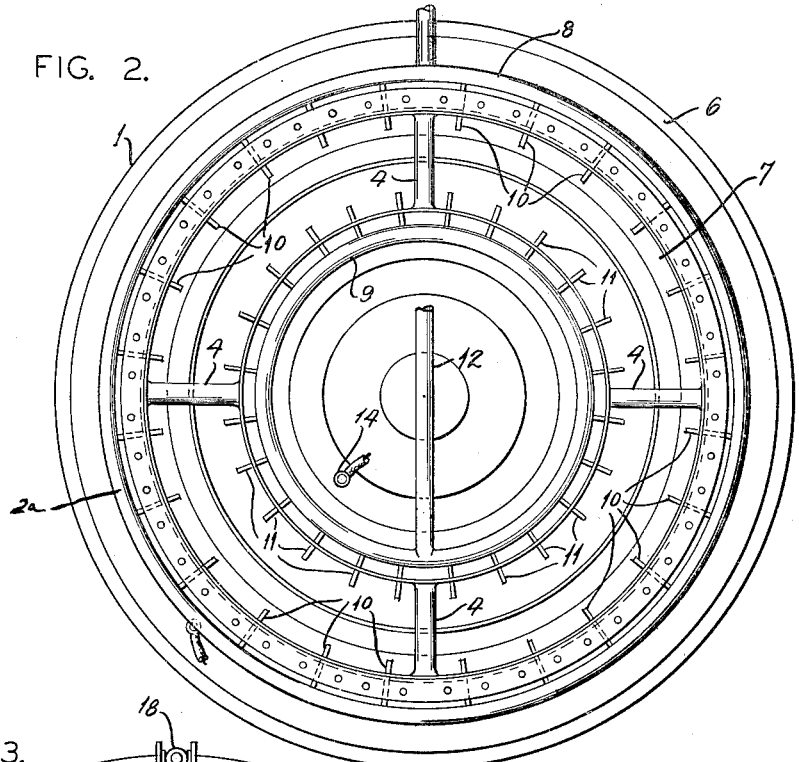
Figure 3:
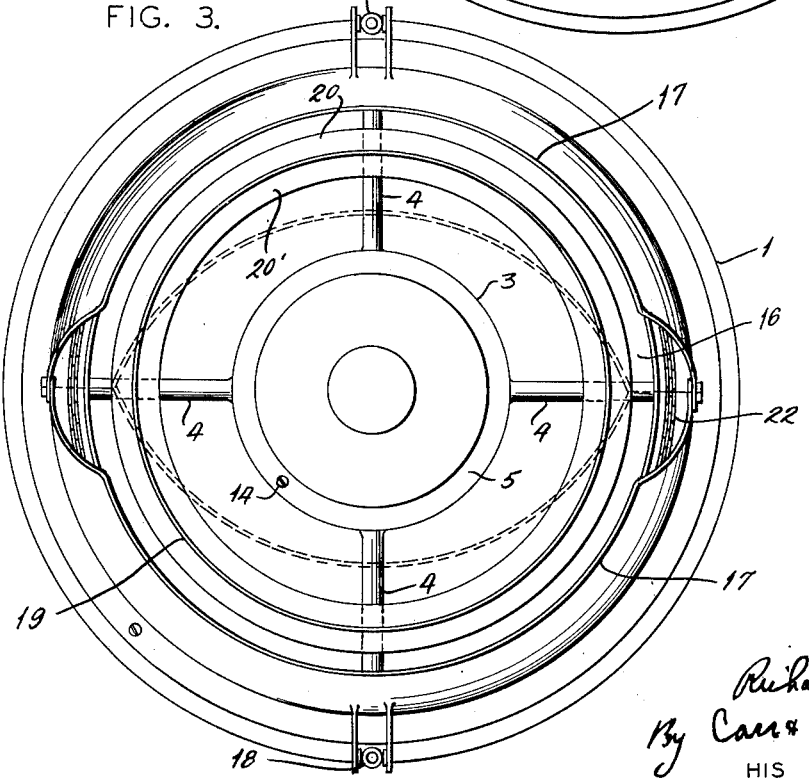
Figure 10:
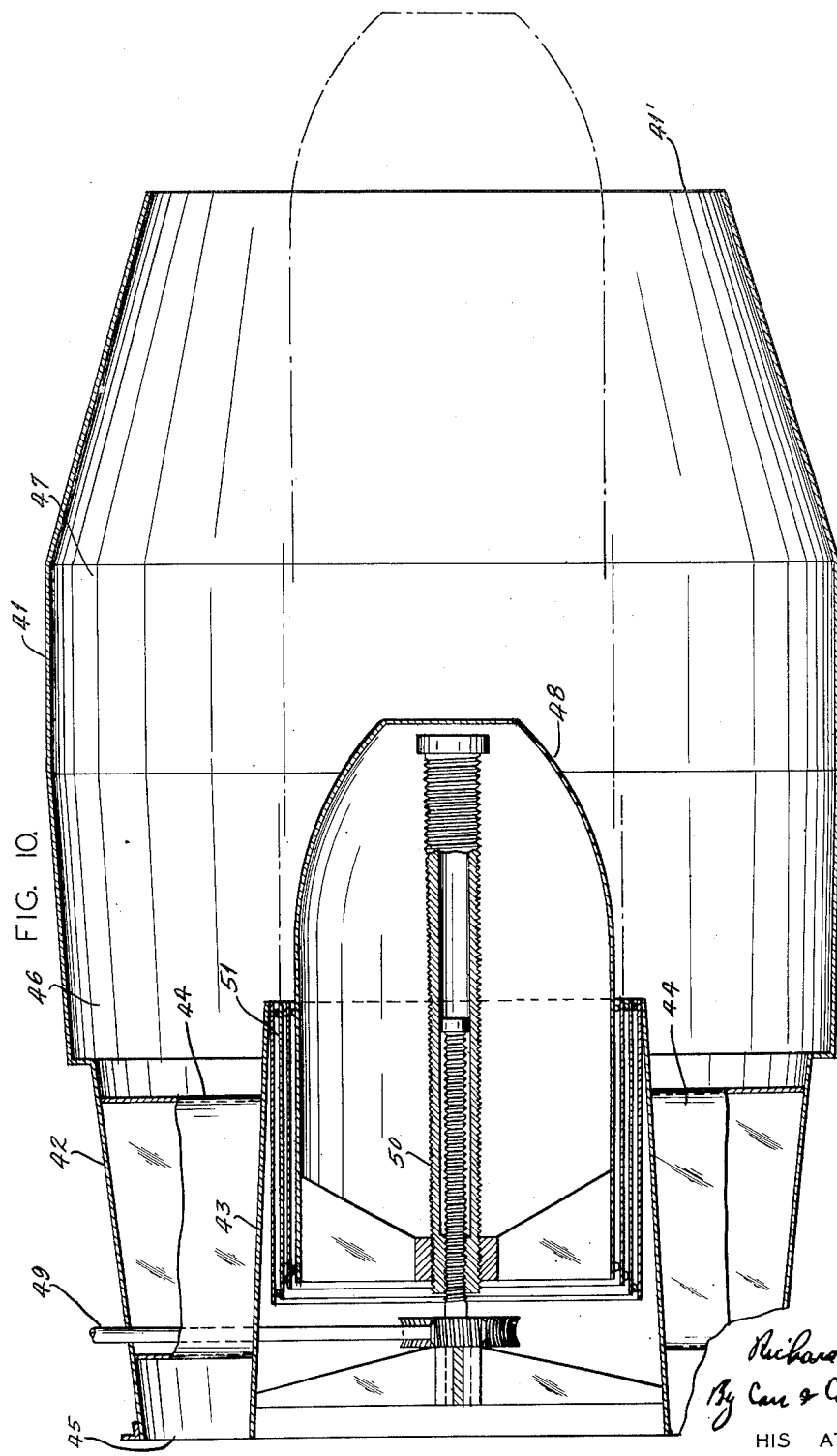

In the drawings:

Fig. 1 is a side view, partly in section, of the improved jet propulsion device, Fig. 2 is an end view looking toward the inlet end of the device of Fig. 1, Fig. 3 is an end view of the other end of the device illustrated in Fig. 1, Fig. 4 is a partial sectional view of the seal for the variable nozzle control, Fig. 5 is a perspective detail view of the seal illustrated in Fig. 4, Fig. 6 is a view showing a modified construction of that illustrated in Fig. 1, Fig. 7 is an elevational view of the inlet end of the device shown in Fig. 6, Fig. 8 is an elevational view of the nozzle end of the device shown in Fig. 6, Fig. 9 is an enlarged detailed view of the fuel discharge orifices shown in Fig. 6; and Fig. 10 is a sectional view of another modification of the engine shown in Fig. 1.

The afterburner and thrust augmenter illustrated in Fig. 1 comprises a tubular member 1 to which a correspondingly-shaped inlet member 2 is secured which, at its left hand end, as viewed in Fig. 1, is provided with appropriate flange 2a for securing it to the exhaust flange of a turbojet engine. An inner diffusing cone 3 is mounted in the inlet member 2 and is held in spaced relationship therewith by means of airfoil struts 4. The cone is provided with a stepped portion 5 substantially in alignment with a corresponding stepped portion 6 between the members 2 and 1.

Fuel is injected in the annular passageway 7 formed between the diffuser cone 3 and the member 2 by means of manifolds 8 and 9. The manifold 8 circumscribes member 2 and is provided with a plurality of tubes 10 that project into the annular passageway 7, the tubes constituting the means by which fuel is introduced into the passageway. The manifold 9 is disposed within the diffuser cone 3 and is provided with a plurality of tubular elements 11 projecting into annular passageway 7, the tubes also constituting means by which fuel is introduced into the passageway. The manifold 9 has a connection to the exterior in the form of a conduit 12 that passes through one of the struts 4 and is then connected to the same fuel supply.

The cone 3 forms a diffusing chamber 13 in member 1 and the stepped portions 5 and 6 acting as flame holders stabilize diffusion eddy currents in the exhaust gases derived from the turbojet engine. These eddy currents travel at a slower rate of speed than do the exhaust gases, and the fuel that has been mixed with these gases is ignited by means of one or more spark plugs 14 set in the stepped portions of the tubular member 1 and the diffusing cone 3. Once the initial ignition of the fuel has been accomplished in the device, the burning thereafter becomes a continuous process.

The tubular member 1 is extended so as to form a combustion chamber 15 wherein the complete burning of the fuel is accomplished. The tubular member 1 at the right hand end is provided with a reduced diameter opening which constitutes the nozzle 16 from which the burned gases produced in the combustion chamber 15 and the gases derived from the turbojet engine are exhausted whereby the thrust of the turbojet engine is augmented in order to drive the plane in which the device is installed at a higher rate of speed.

Under some conditions the operation of the turbojet engine alone will be sufficient to provide the necessary thrust for the vehicle in which it is installed, and during this operation it becomes necessary at times to control the output thereof and one method of control, singly or in combination with other control means, is accomplished by means of eyelid or clamshell members 17 which are pivoted to the tubular member 1 at 17'. Control members 18, operable by the pilot through well-known mechanisms (not shown), regulate the effective area of nozzle 16. This change in nozzle area varies the output of the turbojet engine and thereby, under certain conditions of operation, making the entire device illustrated in Fig. 1 a control valve for regulating the turbojet engine.

Under other conditions of operation, and in order to prevent unduly extending the length of the tubular member 1 to effect complete combustion of the fuel admitted thereto from manifolds 8 and 9, an annular member 19 is installed in the diffuser space 13 that is provided with stepped portions 20 and 20'. This annular member and its stepped portion produce additional eddy currents in the gases and slow down the movement of gases through the annular passageway 7 and the diffusing chamber 13 to thereby afford additional opportunity in which the fuel may be burned in order to secure complete combustion. Therefore, the annular member 19 assists materially in shortening the length of the larger diameter combustion chamber afterburners and makes them readily adaptable even to special types of aircraft having limited engine installation space.

The annular member 19 may also be used without the steps 20, 20'. It then reduces the diffuser expansion angle and increases the pressure recovery.

The fuel injected in annular passageway 7 from manifolds 8 and 9 closely follows the surfaces of the diffuser cone 3 and tubular members 1 and 2, and when the stepped portions 5, 6, 20 and 20' are reached, the eddying effect thereof causes a more complete mixing of fuel with the exhaust gases and materially aids in completing combustion of the fuel to thereby increase the over-all efficiency of the afterburner.

The eyelid or clamshell 17, when used as a control for the turbojet engine output or when in its fully retracted position when the afterburner is in operation, tends to impede the flow of gases through the nozzle. During operation some of the exhaust gases enter the area 21 between the eyelid 17 and the tubular member 1. The gases entering this area tend to over-heat the two parts and because they are of thin section material, distort the shape thereof which causes an appreciable loss of thrust. In order to effectively seal the gases therefrom, a seal construction 22 consisting of two or more superimposed layers of thin section material 22', 22" and 22''', each provided with a plurality of cuts disposed axially of the longitudinal axis of the seal, is provided at the place indicated to prevent gases entering area 21. Three superimposed layers of material are provided, although two may be sufficient, three being shown in the drawings. This sealing construction 22 is secured to the tubular member 1 in a manner such that the cut portions thereof rest against the eyelid 17. Each of the individual members of the seal 22 is so disposed that the cuts of adjacent members are covered so as to produce a labyrinthine passage to impede the flow of gases. The free ends thereof engage the inner surface of eyelid 17 and when the gases tend to enter the area 21, the pressure will act upon the free ends 23 of the seal to force them into engagement with said inner eyelid surface. It is obvious, therefore, that the greater the pressure applied, the greater will be the effectiveness of the seal.

Th tubular member 1 may also be made without the steps, with or without the annular membr 19 which may or may not have the step thereon, and with a diffuser cone which may or may not have a step or steps formed therein. Any series of combination of parts are contemplated wherein one or more of the members may have the step formed thereon with others having smooth surfaces. The size and physical proportions of the engine will determine whether or not certain steps can be eliminated. The step ordinarily holds the flame and normally causes a concentration of heat adjacent to the wall and produces a hot spot along the wall. The elimination of the flame holder step in the outer member causes the flame to spread over a larger area and eliminates the hot spot referred to. The eddying effect of the step in the cone and those that may be in the annulus 19 are then relied upon to secure the fuel combustion desired.

A modified construction of the afterburner is illustrated in Figs. 6, 7, 8 and 9 and comprises a tubular member 24 provided with an inlet tubular member 25 of lesser diameter than that of tubular member 24 so as to form a flame holding step 26 therein.

An inner diffuser cone 27 is disposed in the inlet member 25 to provide an annular passage 28, the diffuser cone 27 being supported in member 25 by a plurality of airfoil struts 29. The diffuser cone has a flame holding stepped portion 30 formed therein and substantially in alignment with the step 26. The diffuser cone is provided with a closed blunted end. The diffusion chamber 31 is formed between cone 27 and the tubular member 24 leading into the combustion chamber 32, and the tubular member 24 is provided with a reduced diameter portion 33 to form an exit nozzle for the combustion chamber. The exit nozzle may be provided with the eyelids or clamshells 34 operated by mechanism 34' and operable by the pilot for varying the exit area of the nozzle for the same reason as set forth in connection with similar mechanism described in connection with Fig. 1. An annular member similar to 19 may also be employed in the device if so desired.

Fuel is injected into the annular passageway 28 through a conduit 36 formed by an auxiliary strip of material 36'. (Fig. 9) secured to tubular member 25. This auxiliary strip is made into substantially semi-cylindrical form. A plurality of semi-spherical depressions 36" is formed in tubular member 25. The discharge openings 37 for the fuel are cut in the depressions 36" and direct fuel into the passageway 28 in a substantially radial direction.

A fuel conduit 38 is formed in the diffuser cone 27, by arranging a ring-shaped member 38" semicircular in cross section within the cone 27. A plurality of depressions 38' is formed in the wall of the diffuser cone, each of which has a discharge opening 39 cut therein through which fuel is ejected into passageway 28. The function of the depressions is identical with that defined above.

Conduits 36 and 38 are connected to a suitable source of fuel supply, the latter having conduit 40 connected thereto that passes through strut 29 and thence to said source of supply.

Each of the flame holding steps 26 and 30 may have ignition means (such as spark plugs, not illustrated) set therein and the functioning of the afterburner is similar to that described and illustrated in Figs. 1, 2 and 3.

A further modification of the afterburner is illustrated in Fig. 10. The burner consists of a tubular member 41 provided with a tubular inlet portion 42 in which a diffuser cone 43 is supported by means of struts 44. The diffuser forms the annular passageway 45 and the diffusing chamber 46 that terminates in the combustion chamber 47. The right hand end of tubular member 41 is contracted so as to form an exhaust nozzle 41'. The diffuser cone 43 is provided with an extensible member 48 operated by a suitable drive mechanism 49 consisting of a worm wheel and telescoping screw jack 50 so that, under certain conditions of operation, the extensible portion 48 may be moved to the dotted line position. The extensible portion 48 is connected to the fixed part of the diffuser cone by means of telescoping members 51. These telescoping members provide a flame holding step in the diffuser cone when in closed position during afterburner operation.

The burner construction may be provided with fuel manifolds and ignition means as illustrated in Fig. 1. When the extensible portion of the diffuser is moved into the nozzle 41' or in dotted line position, it constitutes an exit area control for a jet engine when the burner is used in connection with a turbojet engine and when no fuel is being burned in the afterburner. When fuel is being injected into annular passageway 45, the retractible portion 48 is in solid line position, causing the diffuser to operate in the same manner as that illustrated in Fig. 1.

The above devices have been described as afterburners suitable for augmenting the thrust of turbo or rotary jet engines. They are also employable as ram jet engines and can operate independently of the turbojet engine. To do this, it is only necessary to have the various diffuser cones associated with some part of the vehicle to be propelled and leaving all other structure in its disclosed form.

What I claim is:

1. An afterburner for a reaction type engine comprising a tubular member one of whose ends is securable to the exhaust flange of the engine; a tapered diffuser member inserted in said inlet end for providing an annular passageway for gases derived from said engine; a fuel manifold formed in said tapered member provided with a plurality of fuel discharge means that project into said annular passageway; a fuel manifold formed in said tubular member circumscribing said passageway and provided with a plurality of fuel discharge means that project into said annular passageway; and means for igniting fuel introduced into said passageway.

2. An afterburner for a reaction type engine comprising a tubular member having a flame holder step formed therein and whose inlet end is securable to the exhaust outlet flange of the engine; a tapered diffuser member having an annular flame holder step formed therein and mounted in the inlet end of said tubular member to define an annular passageway for gases derived from said outlet flange and a diffusing chamber; a stepped annular member positioned between said diffuser member and said tubular member; means for introducing fuel into said annular passage; and means for igniting the fuel as it passes through the diffusing chamber.

3. An afterburner for a reaction engine comprising a tubular member having a flame holder step formed therein and one of whose ends is securable to the exhaust flange of the engine; a tapered diffuser member having a flame holder step formed therein and inserted in said inlet end to provide an annular passageway for gases derived from said flange; a fuel manifold integral with said tapered member and provided with a plurality of fuel discharge means that project into said annular passageway; a fuel manifold circumscribing and integral with said tubular member and provided with a plurality of fuel discharge means that project into said annular passageway; and means to ignite fuel introduced into said passageway.

4. An afterburner for a reaction type engine comprising a tubular member the inlet end whereof is securable to the exhaust outlet of the engine, a diffuser member formed substantially as a frustrum of a cone mounted in the inlet end of the tubular member and having an offset substantially intermediate the length thereof for forming an annular flameholder about the cone frustrum, said diffuser defining an annular passageway and a diffusing chamber in the tubular member for gases derived from the engine; and means in the inlet end of said tubular passageway for introducing fuel into the passageway.

5. An afterburner for a reaction type engine comprising a tubular member the inlet end whereof is securable to the exhaust flange of the engine, a diffuser member in the form of a frustrum of a cone mounted in the inlet end of the tubular member, one portion of the cone frustrum being offset from the other portion thereof for forming an annular flameholder thereon, said cone frustrum forming a diffusing chamber in the tubular member and an annular passageway for gases derived from the engine, a fuel manifold arranged in said diffuser provided with a plurality of nozzles projecting into said passageway, a fuel manifold circumscribing said tubular member provided with a plurality of nozzles projecting into said passageway; and means for initially igniting fuel introduced into said passageway.

6. An afterburner for a reaction type engine comprising a tubular member the inlet end whereof is securable to the exhaust end of the engine, the end secured to the engine having an offset therein for forming an annular internal flameholder, a diffuser member in the form of a frustrum of a cone mounted in the inlet end of the tubular member and providing an annular passageway for gases derived from the engine and a diffusing chamber in the tubular member, said diffuser having an offset substantially intermediate the length thereof for forming a circumferential flameholder thereon, means for introducing fuel into said passageway; and means for initially igniting fuel introduced into said passageway.

7. An afterburner for a reaction type engine comprising a tubular member, one end of which is securable to the exhaust end of the engine, the end secured to the engine being tapered, the larger end of the tapered portion being of smaller diameter than the adjoining end of the tubular member for forming an internal annular flameholder, a diffuser member mounted in the tapered portion of said tubular member and being substantially in the form of a frustrum of a cone, the diffuser member forming an annular passageway for gases and a diffusing chamber, the portion of one diffuser member being of greater diameter than the other portion for forming an annular flameholder, means disposed within said cone frustrum and without said tubular member provided with nozzles extending into said passageway for introducing fuel into the passageway; and means for initially igniting fuel introduced into the passageway.

8. An afterburner for a reaction type engine comprising a tubular member securable to the exhaust flange of the engine, a diffuser member in the form of a truncated cone mounted in the end of the tubular member securable to the flange and providing an annular passageway for gases derived from the engine and a diffusing chamber in said tubular member, said cone having one portion offset from the other portion to thereby provide an annular flameholder about the diffuser member, an annular divider mounted in said passageway, annular flameholder means supported by said divider, means supported in the afterburner for introducing fuel into said passageway ahead of said divider; and means for initially igniting fuel introduced into said passageway.

9. An afterburner for a reaction type engine comprising a tubular member, one end thereof being tapered, the small end of the tapered portion securable to the flange of the engine, the larger end of the tapered portion being smaller in diameter than the diameter of the adjoining part of the tubular member for forming an annular internal flameholder therein, a diffuser member in the form of a frustrum of a cone mounted in the tapered portion of the tubular member for forming an annular passageway and a diffusing chamber in the tubular member, a tubular divider mounted in said passageway, annular flameholder means mounted on said divider, means in the afterburner for introducing fuel into said passageway ahead of said divider; and means for initially igniting fuel introduced into the passageway.

10. An afterburner for a reaction type engine comprising a tubular member the inlet end whereof is securable to the exhaust flange of the engine, an annular flameholder forming part of said tubular member disposed near the inlet end securable to the engine flange, a diffuser member in the form of a frustrum of a cone mounted in the end of the tubular member securable to the engine flange and providing an annular passageway for gases derived from the engine and a diffusing chamber therein, said diffuser member having an annular flameholder formed therein in substantial alignment with the flameholder in said tubular member, a tubular divider in said passageway, flameholder means thereon for cooperating with the flameholder in said tubular member and on said cone, annular fuel manifolds, one mounted in said diffuser member and the other mounted on and disposed about said tubular member, each manifold provided with means for introducing fuel into said passageway ahead of said divider; and means for initially igniting fuel introduced into said passageway.

11. An afterburner for a reaction type engine comprising a tubular member secured to the exhaust flange of the engine and having a tapered portion for forming an internal annular flameholder in said tubular member near the end securable to the engine flange, a diffuser member in the form of a frustrum of a cone mounted in the tapered end of the tubular member and providing an annular passageway for gases derived from the engine and a diffusing chamber therein, said cone frustrum having an annular flameholder formed therein substantially in alignment with the flameholder in said tubular member, a tubular divider member mounted in said passageway, an internal annular flameholder in said divider, an annular external member on said divider, annular fuel manifolds, one mounted in said diffuser member and the other mounted on and disposed about said tubular member, nozzles on said manifolds for introducing fuel into said passageway ahead of said divider; and means for initially igniting fuel introduced into said passageway.

12. An afterburner for a reaction type engine comprising a tubular member securable to the exhaust end of the engine, the end secured to the engine having an offset therein for forming an annular internal flameholder, a conical member mounted in the end of the tubular member secured to the engine and providing an annular passageway for gases derived from the engine and a diffusing chamber in the engine, said conical member having an offset substantially intermediate the length thereof for forming a circumferential flameholder thereon, means for introducing fuel into said passageway; and means for initially igniting fuel introduced into said passageway.

13. An afterburner for a reaction type engine comprising a tubular member securable to the exhaust flange of the engine, a conical member mounted in the end of the tubular member securable to the flange for providing an annular passageway for gases derived from the engine and a diffusing chamber in said tubular member, said conical member having one portion offset from the other portion to thereby provide an annular flameholder about the conical member, an annular divider mounted in said passageway, annular flameholder means supported by said divider, means for introducing fuel into said passageway ahead of said divider; and means for initially igniting fuel introduced into said passageway.

RICHARD G. LAUCHER.

References Cited in the file of this patent

UNITED STATES PATENTS

| Number | Name | Date |
| --- | --- | --- |
| 2,268,464 | Seippel | Dec. 30, 1941 |
| 2,304,008 | Müller | Dec. 1, 1942 |
| 2,385,833 | Nahigyan | Oct. 2, 1945 |
| 2,402,363 | Bradbury | June 18, 1946 |
| 2,405,723 | Way | Aug. 13, 1946 |
| 2,408,099 | Sherman | Sept. 24, 1946 |
| 2,447,482 | Arnold | Aug. 24, 1948 |
| 2,448,561 | Way | Sept. 7, 1948 |
| 2,506,611 | Neal et al. | May 9, 1950 |
| 2,518,881 | Goddard | Aug. 15, 1950 |
| 2,522,081 | Allen | Sept. 12, 1950 |
| 2,579,043 | Kallal | Dec. 18, 1951 |

FOREIGN PATENTS

| Number | Country | Date |
| --- | --- | --- |
| 919,004 | France | Nov. 18, 1946 |
| 920,910 | France | Jan. 8, 1947 |